United States Patent [19]
Zünkler

[11] Patent Number: 5,943,438
[45] Date of Patent: Aug. 24, 1999

[54] METHOD FOR PATTERN RECOGNITION

[75] Inventor: Klaus Zünkler, Dachau, Germany

[73] Assignee: Siemens Aktiengesellschaft, Munich, Germany

[21] Appl. No.: 08/913,182

[22] PCT Filed: Feb. 19, 1996

[86] PCT No.: PCT/DE96/00253

§ 371 Date: Sep. 8, 1997

§ 102(e) Date: Sep. 8, 1997

[87] PCT Pub. No.: WO96/27871

PCT Pub. Date: Sep. 12, 1996

[30] Foreign Application Priority Data

Mar. 7, 1995 [DE] Germany .................. 195 08 016

[51] Int. Cl.$^6$ ............................................. G06K 9/62
[52] U.S. Cl. ............................................. 382/159
[58] Field of Search .................. 382/119, 121, 382/159; 704/231, 242, 256

[56] References Cited

U.S. PATENT DOCUMENTS 5,502,791 3/1996 Nishimura et al. ............... 704/256
5,812,974 9/1998 Hemphill et al. ............... 704/256

FOREIGN PATENT DOCUMENTS 0 533 491 3/1993 European Pat. Off. .
WO 94/23424 10/1994 WIPO .

OTHER PUBLICATIONS

Y. Ephraim et al., "On The Application Of Hidden Markov Models For Enhancing Noisy Speech", IEEE Transactions on Acoustics, Speech, and Signal Processing, vol. 37, No. 12, Dec. 1989, pp. 1846–1856.

J. Song, "A Robust Speaker–Independent Isolated Word HMM Recognizer For Operation Over The Telephone Network", 8308 Speech Communication, Dec. 1993, Nos. 3/4, pp. 287–295.

R. Cardin et al., "Inter–Word Coarticulation Modeling and MMIE Training for Improved Connected Digit Recognition", Speech Processing, Apr. 1993, pp. II–243–II–246.

L.R. Rabiner et al., "An Introduction to Hidden Markov Models", IEEE Transactions of Acoustics, Speech and Signal Processing, 1986, pp. 4–16.

G. David Forney, Jr., "The Viterbi Algorithm", Proceedings of the IEEE, vol. 61, No. 3, Mar. 1973, pp. 268–278.

R. Rose et al., A Hidden Markov Model Based Keyword Recognition System[1], IEEE International Conference on Acoustics, Speech and Signal Processing, 1990, pp. 129–132.

*Primary Examiner*—Amelia Au
*Assistant Examiner*—Samir Ahmed
*Attorney, Agent, or Firm*—Hill & Simpson

[57] ABSTRACT

A special method recognizes patterns in measurement signals. Speech signals or signals emitted by character recognition apparatuses are thereby meant. For the execution of the invention, the hidden Markov models with which the patterns to be recognized are modeled are expanded by a special state that comprises no emission probability and transition probability. In this way, the temporal position of the sought pattern becomes completely irrelevant for its probability of production. Furthermore, the method offers the advantage that new and unexpected disturbances can also be absorbed without the model's having to be trained on them. In contrast to standard methods, no training on background models need be carried out. However, this means a higher expense during the recognition of the patterns, since the individual paths of the Viterbi algorithm have to be normed to the current accumulated probabilities in the path with respect to their probabilities, in order to be able to compare them. The inventive method offers the advantage that only the time segment of the measurement signal also containing the pattern has to be analyzed. An increased probability of a hit is thereby reconciled with a lower computing expense.

10 Claims, 1 Drawing Sheet

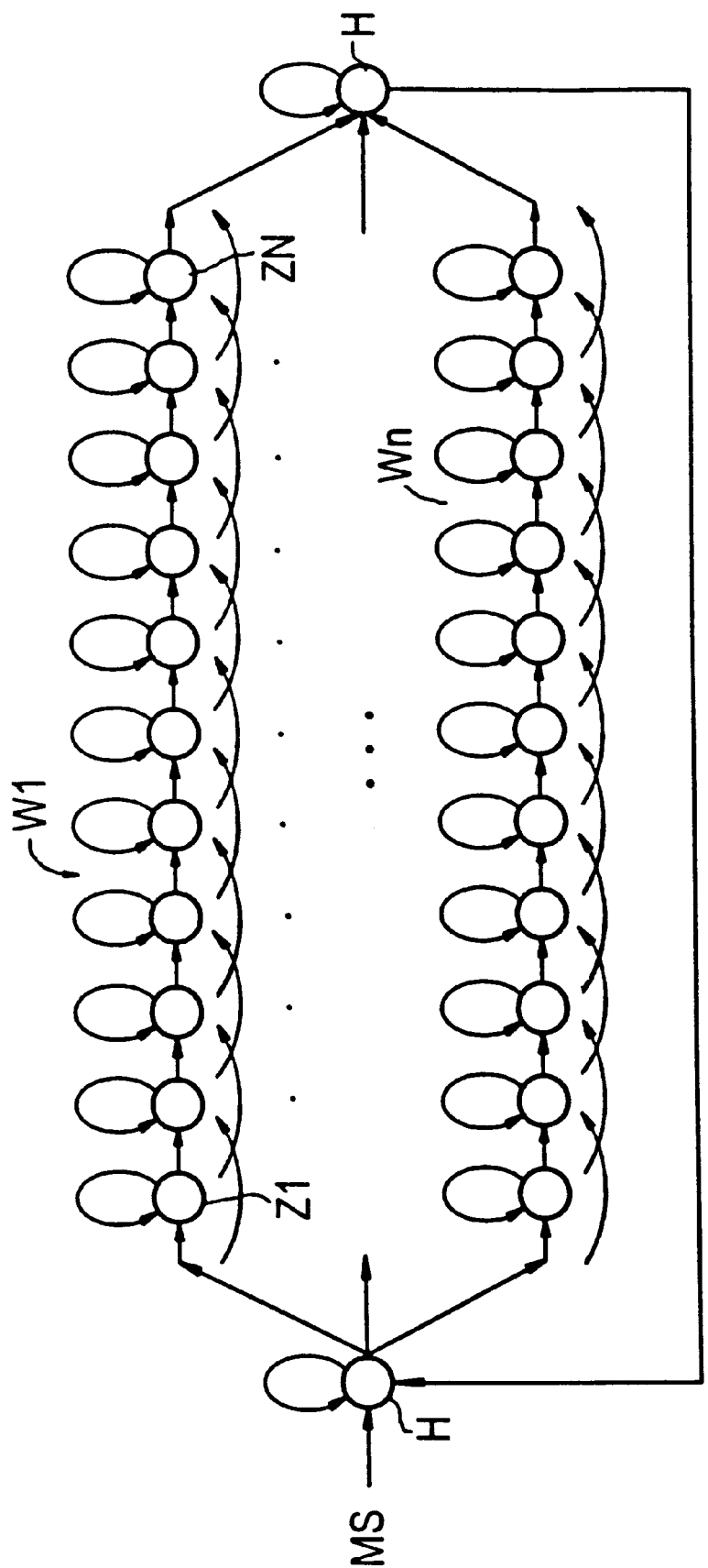

METHOD FOR PATTERN RECOGNITION

BACKGROUND OF THE INVENTION

1. Field of Invention

The present invention relates to a method for recognizing at least one defined pattern modeled by hidden Markov models in a time-variant measurement signal on which at least one disturbing signal is superposed.

2. Description of the Related Art

Pattern recognition is gaining in importance in technical systems, due to increased use of automatization. The patterns are often contained in measurement signals obtained in one way or another from processes that are to be examined. Examples include the analysis of natural language or the examination of executed signatures. Hidden Markov models have proven particularly suitable for the automatic analysis of measurement signals. For example, see the publication by Rabiner, et al, "An Introduction to Hidden Markov Models".

However, a problem in the automatic analysis of measurement signals is that the measurement signals to be examined are often overlaid with variable or occasional disturbing signals or with disturbing signals that are constant in quantity. In the acquisition and analysis of naturally uttered speech, these can be e.g. background noises, breathing noises, machine noises, or also disturbing noises that arise due to the recording medium and the transmission path. For other measurement signals, analogous error sources are possible. In order to be able to find a known pattern within a larger pattern despite the existing difficulties, an approach with special hidden Markov models has been proposed in the publication by Rose et al., "A Hidden Markov Model Based Keyboard Recognition System". A specific model is hereby introduced (termed a garbage or background model) that models background noise, including other speech. This specific model must in all cases be trained with corresponding noises or, respectively, speech. This means that only those noises or, respectively, disturbances that are present in the training material can be taken into account when recognizing a pattern. In each case, the modeling of this model has a large influence on the overall probability of a key word, or, of any pattern to be recognized. A further disadvantage is that this background model also recognizes speech sounds, or, respectively, pattern portions in other types of measurement signal, which actually belong to a pattern or, respectively, a keyword to be recognized. The additional problem of a suitable weighting of the model in order to avoid an excessively low detection rate thereby results, as discussed in the Rose publication. Further possibilities for taking into account disturbing portions in the analysis of measurement signals, using hidden Markov models, are not known from the prior art.

SUMMARY OF THE INVENTION

The underlying aim of the present invention is thus to provide a method with which patterns that are present in a measurement signal, and on which a disturbing signal is superposed, can better be recognized.

This aim is solved by the method for recognizing at least one defined pattern modeled by hidden Markov models in a time-variant measurement signal on which at least one disturbing signal is superposed, a) in which each of the hidden Markov models is supplemented at its beginning and at its end by respectively one single identical state that serves to represent the disturbing signal and has least the following characteristics:

in order to achieve independence of the temporal position of the defined pattern, it comprises no transition probabilities, in order to achieve independence of disturbing signals in the temporal environment of the defined pattern, it comprises no emission probabilities, b) and in which the defined pattern is sought and recognized with a known comparison method, using the expand hidden Markov models in the time-variant measurement signal.

Developments of the invention are provided by the method in which the Viterbi algorithm is used as a comparison method. In the alternative, the Baum-Welch method is used as a comparison method. In either case, in the comparison method in each recombination of paths, the overall emission probabilities accumulated per path are normed to the number of the emission probabilities taken into account up to this time, in order to avoid a preferring of shorter paths.

The norming ensues in the following way:

$$\Delta_t^{increment}(i,j) = \begin{cases} 0 \text{ if } Segm(j) = S_0 \text{ and } i = j \\ A_{ij} + LSc(S_j, O_t) \text{ otherwise} \end{cases}$$

$$\Psi(j) = \underset{1 \leq i \leq N}{\operatorname{argmin}} \frac{\Delta_t(i) + \Delta_{t+1}^{increment}(i,j)}{l_t(i) + 1}$$

with:

$$\Delta_{t+1}(j) = \Delta_t(\Psi(j)) + \Delta_{t+1}^{increment}(\Psi(j), j) \quad \text{integral score}$$

$$LSc(S_k, O_t) = B(S_k, O_t) - \min_{1 \leq l \leq N-1} B(S_l, O_t) \quad \text{local score}$$

$Segm(1) = Segm(N) = S_0$ $a_{ij}$ is notated as $A_{ij}$ (i.e., $A_{ij} = \text{const} \ln a_{ij}$)

$b_j(O_t)$ is notated as $B(S_k, O_t) = -\text{const} \ln b_k(O_t)$ $\delta_t(j)$ is notated as $\Delta_t(j)$ t: current time j: current model state $a_{ij}$: the transition probability $b_j(O_t)$: the emission probability of observation $O_t$ N: number of model states whereby $l_t(i)$ designates the number of $\Delta^{increment}$ that are accumulated in $\Delta_t(i)$ and that come from the "otherwise" case of the $\Delta^{increment}$ definition; scores are notated in place of probabilities, otherwise designations analogous to the Rabiner, et al. publication.

An embodiment of the invention provides that the maximum operation is replaced by a summation function.

The measurement signal of a speech signal may be used, or the measurement signal of a handwriting process is used, or the measurement signal is determined by optical means, or the measurement signal is determined by measurement of the pressure used during writing.

A particular advantage of the inventive method is that it can eliminate background noises of any type, and at the same time differs from all other phoneme models.

A further advantage of the inventive method is that the hidden Markov models used for pattern recognition do not have to be trained on background noises.

Advantageously, by means of the inventive method the probability for a pattern recognition is here increased completely independently of disturbing noises which may be present in the measurement signal. Advantageously, only the time segment of the measurement signal is thus examined in which the pattern to be recognized is present.

Advantageously, the inventive method is suited for application for all types of standard method.

The Viterbi algorithm can be used to particular advantage for pattern searching and for the evaluation of the probabilities The publication by Forney entitled "The Viterbi Algorithm" provides background information on this. Advantageously, the method is however also suited for the Baum-Welch method, for which only small modifications are required.

Advantageously, the present method provides that, with the use of the Viterbi algorithm, the overall emission probabilities accumulated in the path are normed to the number of the emission probabilities taken into account up to that time, in order to avoid a preference for shorter paths.

Advantageously, the inventively executed changing of the hidden Markov models in the calculation of the overall emission probabilities is taken into account in that a simple factor is introduced which, dependent on existing background states, changes the number of emission probabilities to be taken into account the number of these emission probabilities depending on existing background states, or, respectively, on the disturbing noises.

Advantageously, with the use of the Baum-Welch method in the inventive method, the summation function is used as a replacement for the maximum operation, in order likewise to be able to take into account the different number of emission probabilities occurring on the path.

With the inventive method, speech signals, and thereby in particular keywords, can be particularly advantageously analyzed with the inventive method. Background noises often occur there, and, due to the high data streams that occur there and the real-time requirements, mathematically efficient methods for speech analysis are particularly important.

The inventive method can also be used advantageously for the analysis of handwriting processes, whereby the measurement signal that is to be analyzed is particularly advantageously determined by optical means or pressure measurement means. Frequently occurring pattern recognition processes are involved here, for which reliable methods are required.

BRIEF DESCRIPTION OF THE DRAWINGS

In the following, the invention is explained in more detail on the basis of a FIGURE.

FIG. 1 shows an example of a method according to the present invention.

DETAILED DESCRIPTION OF THE PREFERRED EMBODIMENTS

Various hidden Markov models W1 to Wn are shown in FIG. 1 for the individual patterns to be recognized. The individual hidden Markov models of the patterns to be recognized are distinguished by a large number of states Z1 to ZN. Particularly advantageously, a particular state, designated here with the reference symbol H, is attached to each individual hidden Markov model by means of the inventive method. Advantageously, this state is respectively added directly in front of and directly behind the respective hidden Markov model to be recognized. This state H of the respective hidden Markov model represents the disturbing noises in the environment. It is distinguished particularly in that it has no emission probability and no transition probability. In this way, by means of the inventive method it is particularly advantageously achieved that the respective pattern to be investigated, and the hidden Markov model present therefor, can easily be brought to coincide, since only the relevant time segment in which the pattern occurs in the measurement signal is used for the recognition of the pattern. The measurement signal MS to be analyzed is here indicated going in from the left.

The inventive method can, for example, be used for automatic speech recognition in single-word command systems. There, in practice the case often occurs in which the speaker utters one of the allowed command words, embedding it for example in a sentence. A further case that cannot be solved satisfactorily with conventional recognizers is that of disturbance before and after the command or keyword, due to the presence of an environmental noise.

As a solution, the inventive method is here proposed, which method is able, for example, to find and recognize keywords within arbitrary disturbing signals. In contrast to other approaches, no assumptions are hereby made concerning the background noises. If the method is used for speech recognition, no assumptions about the type of disturbing signal are required. The inventive method achieves this by using hidden Markov models whereby each model for a keyword or a pattern to be recognized is supplemented at the beginning and end of the word with a specific state that represents the background noise or, respectively, the disturbance. Thus, in contrast to the known method, this specific state need not be trained for possible background noises. Thus, with the described method it is easily possible to take into account only that time segment that actually contains the relevant pattern. The rest of the signal can thereby be left out of account, and the word recognition or, respectively, pattern recognition is thus greatly simplified, and the computing expense connected therewith is greatly reduced.

Previous methods have the disadvantage that the underlying background model for the disturbing noises also contains pattern portions. A clean division between the pattern to be recognized and the background noise is thus not given. The inventive method, which quasi-artificially specially prepares the pattern to be recognized in the message signal flow, begins here. For this purpose, the processed hidden Markov models for the individual patterns are expanded by a special state, distinguished in that it contains no emission energy and no transition probability. The pattern to be recognized is thereby cleanly separable from the rest of the measurement signal information. The inventive method thus makes it possible that for pattern recognition precisely the time segment of the measurement signal can be used that contains the pattern to be recognized. As in the known methods, here a specific model for background disturbances is added to the hidden Markov models of the pattern to be recognized. However, this pattern model consists only of a single state, and differs from the other standard models both in its transition probabilities and in its emission probabilities. The selected transition probability takes into account that no prediction can be made concerning the duration of the environmental disturbance. The temporal position of the sought pattern is thus entirely irrelevant for a production probability, as desired. In addition, an explicit determination of the word boundaries is superfluous. Analogously to the transition probabilities, the emission probabilities are also not taken into account, since the disturbances cannot be sufficiently modeled. This has the great advantage that new and unexpected disturbances are also absorbed, without its being necessary to train the model for them. In speech recognition, the probability for a keyword is thus entirely independent of the environment, i.e., only the time segment relevant for the keyword is taken into account. However, this advantage of the unnecessary training of a background model is bought at the price of an increased computing expense in the recognition of the pattern. The following problem thereby arises:

In the recombination, i.e. in the comparison of two possible paths and the decision for the more probable path, different emission probabilities, many valid, are contained in the paths in general. This also results from Table 1, which contains a program listing in pseudo-code and presents an example of the inventive method. There, the segment accumulate-emission-probability is particularly to be taken into account. The problem is that the Viterbi algorithm always decides for the path with the highest probability. Here, as a rule this is the path with the fewest valid emission probabilities. This has the consequence that for each comparison a norming of the accumulated probability to the respective number of valid emission probabilities on the associated path must be carried out. In particular, in this evaluation the nature of the added artificial environmental state must be taken into account, which, as already specified above, comprises no emission probability or transition probability, and thus would lead to a falsification of the evaluation. Expressed in a formula, the accumulated probability for the standard Viterbi method is indicated by the following effective recursive equation:

$$\delta_{t+1}(j) = \max_{1 < i < N} (\delta_t(i) a_{ij} * b_j(O_{t+1}))$$

Here, t indicates the current time, j indicates the current model state, i, j are indices of the model states, a is the transition probability from the state i to the state j, $b_j$ is the emission probability of the state j in the observation O, e.g. the features of a speech signal, and N is the number of the model states. In the present method, this is converted into another form of representation. The following correlation then holds for the emission probability. For example, np segments $\{S_0, S_1, S_{N-1}\}$ are defined, whereby for example $S_0$ is what is known as the background model segment. Exactly one segment Segm(j)=$S_k$ is thereby allocated to each state j, $1 \leq j \leq N$, whereby Segm(1)=Segm(N)=$S_0$. In the following, scores are notated in place of probabilities; otherwise, analogous to the Rabiner publication.

$a_{ij}$ is notated as $A_{ij}$ (i.e., $A_{ij}$=−const ln$a_{ij}$)
$b_j(O_t)$ is notated as $B(S_k, O_t)$=−const ln $b_k(O_t)$
$\delta_t(j)$ is notated as $\Delta_t(j)$
in addition, the following is defined:

$$LSc(S_k, O_t) = B(S_k, O_t) - \min_{1 \leq l \leq N-1} B(S_l, O_t) \quad \text{local score}$$

The HMN recursion algorithm can thus be represented in the following modification:

$$\Delta_t^{increment}(i, j) = \begin{array}{l} 0 \text{ if } segm(j) = S_0 \text{ and } i = j \\ A_{ij} + LSc(S_j, O_t) \text{ otherwise} \end{array}$$

$$\Psi(j) = \mathop{\text{argmin}}_{1 \leq i \leq N} \frac{\Delta_t(i) + \Delta_{t+1}^{increment}(i, j)}{l_t(i) + 1}$$

$$\Delta_{t+1}(j) = \Delta_t(\Psi(j)) + \Delta_{t+1}^{increment}(\Psi(j), j) \quad \text{integral score}$$

whereby $l_t(i)$ designates the number of the $\Delta^{increment}$ that are accumulated in $\Delta_t(i)$ and come from the "otherwise" case of the definition of $\Delta^{increment}$.

Analogously, this also results for the Baum-Welch method, if the argmin operation is replaced by the summation function. In comparison to the standard recognition methods, here the memory outlay in the inventive method doubles, due to the additional storing of the path lengths. However, this method is very robust in relation to arbitrary background disturbances before and after the pattern to be recognized, due to the omission of a training for the background disturbances. Particularly advantageously, this method can be used not only for speech recognition, but for pattern recognition in general (e.g. in medical technology, image recognition, character recognition).

In the following, table 1 is explained, which indicates an example of an inventive method as a program in pseudo-code with which speech recognition according to the inventive method can be carried out.

The program begins with a main routine bounded by main and end. It contains the subroutine word-spotter. For example, here command words contained in a speech signal are recognized. This is supposed to take place using trained hidden Markov models. The subroutine word-spotter now carries out a calculation of the model emission probabilities for each reference model. This is solved in the form of a do loop with "foreach" and "enddo". The do loop contains a routine, compute-model-emission-probability. In this loop, the local logarithmic emission probability, i.e. the probability that the feature vector $O_t$ has been emitted by the model state k, is calculated for all feature vectors of the pattern to be classified. Subsequently, the emission probability of the best path for model state k is determined. This takes place with the subroutine accumulate-emission-probability. The length of the best path is determined and stored by this routine. If the end of the word has been reached, the routine if word_end_detected detects this, and causes a return to the main program. The routine compute-model-emission-probability contains a further subroutine compute-local-emission-probability. The local emissions probabilities $b_k(O_t)$ of the individual states are determined with this routine. This is particularly important, because the inventive method begins here. This is because, according to the present invention, the particular state added to the individual Hidden Markov models at the beginning of the pattern and at the end of the pattern comprises no emission probability. That is, its local probability is 1 and its emission probability is accordingly 0. For this case, this subroutine returns the value 0; otherwise, it calculates the emission probability for the current feature vector in an entirely normal fashion. The subroutine compute-model-emission-probability additionally contains the subroutine accumulate-emission-probability. There the accumulated probabilities of the individual paths of all possible precursors are compared with one another, normed to their respective lengths. The best probability for the recognition of the pattern is subsequently stored. That is, the sum of the accumulated logarithmic emission probability of the best possible precursor state and of the local logarithmized emission probability is stored. The length of the pattern to be recognized is thereby for example stored without the background noise.

This example is not to be regarded as limiting for the invention. It is intended only to provide an example of the basic idea of the invention. In particular, it is to be noted that the invention is suited for arbitrary types of pattern recognition. In particular, it can also be used in character recognition and in signaling methods.

Although other modifications and changes may be suggested by those skilled in the art, it is the intention of the inventors to embody within the patent warranted hereon all changes and modifications as reasonably and properly come within the scope of their contribution to the art.

TABLE 1

```
main( )
    word-spotter( )         !Word spotting with hidden
                            !Markov models
end
word-spotter( )
    foreach reference-model m do
                            !Loop over combined reference
                            !models
        cospute-model-emission-probability( )
                            !Calculate overall emission
                            !probability of the model, i.e.
                            !probability that the sequence to
                            !be classified of feature vectors
                            !was produced by the Markov model
                            !m
    enddo
    ranking( )              !Order Markov models according to
                            !their overall ernission
                            !probability
    rejecting( )            !Rejection of expressions without
                            !keyword
end
compute-model-emission-probability( )
    initialize( )           !initialize accumulated emission
                            !probabilities
    foreach frame t do      !loop over feature vectors of the
                            !pattern to be classified
        foreach state k do      !loop over model states
            compute-local-emission-probability( )
                            !Calculate local logarithmized
                            !emission probability, i.e.,
                            !probability that the feature
                            !vector O_t has been emitted by
                            !the model state k
            accumulate-emission-probability( )
                            !Calculate emmission probability
                            !of the best path for model
                            !state k and store length of the
                            !best path inside the keyword
        end do k
        if word_end_detected( )  !Break off the search if
                            !the word end was detected
            return
    end do t
end
compute-local-emission-probability( )
    if state == background   !If background noise model state
                            !is expected, local probability =
                            !1
        return 0            ! = log (1)
    else
        compute-emission-probability( )
                            !Calculation of a logarithmized
                            !emission probability for the
                            !current feature vector
    endif
end
accumulate-emission-probability( )
    compare-emission-probabilities( )
                            !Compare the accumulated
                            !probabilities of all possible
                            !precursors, normed to their
                            !respective length
    store-best-probability( )
                            !store sums of accumulated
                            !logarithmized emission
                            !probability of the best possible
                            !precursor state and of the
                            !local logarithmized emission
                            !probability; thereby store the
                            !length of the word without
                            !background noise.
end
```

I claim:

1. A method for recognizing at least one defined pattern modeled by hidden Markov models in a time-variant measurement signal on which at least one disturbing signal is superposed, comprising the steps of:

a) supplementing each of the hidden Markov models at its beginning and at its end by respectively one single identical state that serves to represent the disturbing signal and has at least the following characteristics:

in order to achieve independence of temporal position of defined pattern, said single identical state is free of transition probabilities, in order to achieve independence of disturbing signals in temporal environment of the defined pattern, said single identical state is free of emission probabilities, b) seeking and recognizing the defined pattern with a predetermined comparison method using expanded hidden Markov models in a time-variant measurement signal.

2. A method according to claim 1, wherein said predetermined comparison method is the Viterbi algorithm.

3. A method according to claim 1, wherein said predetermined comparison method is the Baum-Welch method.

4. A method according to claim 2, further comprising the step of:

in the comparison method in each recombination of paths, norming overall emission probabilities accumulated per path to a number of the emission probabilities taken into account up to this time, in order to avoid a preferring of shorter paths.

5. A method according to claim 4, wherein said step of norming ensues in the following way:

$$\Delta_t^{increment}(i, j) = \begin{cases} 0 & \text{if } Segm(j) = S_0 \text{ and } i = j \\ A_{ij} + LSc(S_j, O_t) & \text{otherwise} \end{cases}$$

$$\Psi(j) = \underset{1 \leq i \leq N}{\operatorname{argmin}} \frac{\Delta_t(i) + \Delta_{t+1}^{increment}(i, j)}{l_t(i) + 1}$$

with:

$$\Delta_{t+1}(j) = \Delta_t(\Psi(j)) + \Delta_{t+1}^{increment}(\Psi(j), j) \quad \text{integral score}$$

$$LSc(S_k, O_t) = B(S_k, O_t) - \min_{1 \leq l \leq N-1} B(S_l, O_t) \quad \text{local score}$$

$Segm(1) = Segm(N) = S_0$, $a_{ij}$ is notated as $A_{ij}$ (i.e., $A_{ij}$=const $\ln a_{ij}$)

$b_j(O_t)$ is notated as $B(S_k, O_t)$=-const $\ln b_k(O_t)$ $\delta_t(j)$ is notated as $\Delta_t(j)$ t: current time j: current model state $a_{ij}$: the transition probability $b_j(O_t)$: the emission probability of observation $O_t$ N: number of model states whereby $l_t(i)$ designates the number of $\Delta^{increment}$ that are accumulated in $\Delta_t(i)$ and that come from the "otherwise" case of the $\Delta^{increment}$ definition; scores are notated in place of probabilities.

6. A method according to claim 3, comprising the step of: performing a summation function in place of a maximum operation.

7. A method according to claim 1, wherein said measurement signal is a speech signal.

8. A method according to claim 1, wherein said measurement signal is a handwriting process signal.

9. A method according to claim 8, wherein said measurement signal is obtained optically.

10. A method according to claim 8, wherein said measurement signal is obtained by measurement of pressure used during writing.

* * * * *